(12) United States Patent
Zeiner et al.

(10) Patent No.: US 9,636,749 B2
(45) Date of Patent: May 2, 2017

(54) INDEXABLE CUTTING INSERT, CUTTING INSERT HOLDER, CUTTING TOOL, TURNING DEVICE AND TURNING METHOD

(71) Applicant: Sumitomo Electric Hardmetal Corp., Itami-shi (JP)

(72) Inventors: Christoph Zeiner, Willich (DE); Andreas Widmann, Willich (DE); Yoshikatsu Mori, Itami (JP); Makoto Abe, Willich (DE)

(73) Assignee: SUMITOMO ELECTRIC HARDMETAL CORP., Itami-shi (JP)

( * ) Notice: Subject to any disclaimer, the term of this patent is extended or adjusted under 35 U.S.C. 154(b) by 207 days.

(21) Appl. No.: 14/376,611

(22) PCT Filed: Apr. 26, 2013

(86) PCT No.: PCT/JP2013/002836
§ 371 (c)(1),
(2) Date: Aug. 4, 2014

(87) PCT Pub. No.: WO2014/174555
PCT Pub. Date: Oct. 30, 2014

(65) Prior Publication Data
US 2015/0000481 A1 Jan. 1, 2015

(51) Int. Cl.
*B23B 27/16* (2006.01)
*B23B 27/14* (2006.01)
(Continued)

(52) U.S. Cl.
CPC .............. *B23B 27/145* (2013.01); *B23B 1/00* (2013.01); *B23D 37/005* (2013.01);
(Continued)

(58) Field of Classification Search
CPC .......... B23B 27/145; B23B 2200/0447; B23B 2200/086; B23B 2200/125;
(Continued)

(56) References Cited

U.S. PATENT DOCUMENTS 4,838,739 A 6/1989 Stashko
8,051,543 B2 * 11/2011 Arisue .................... B23B 3/065
29/27 C
2007/0245531 A1 10/2007 Kummer

FOREIGN PATENT DOCUMENTS

DE 20 2004 015 343 U1 12/2005
DE 10 2004 026 675 C5 1/2010
(Continued)

OTHER PUBLICATIONS

International Search Report in PCT International Application No. PCT/JP2013/002836, dated Nov. 15, 2013.
(Continued)

*Primary Examiner* — Daniel Howell
*Assistant Examiner* — Alan Snyder
(74) *Attorney, Agent, or Firm* — Venable LLP; Michael A. Sartori; F. Brock Riggs (57) ABSTRACT

An indexable cutting insert comprises a flank face having a generally parallelogram shape and a plurality of side faces. The flank face is bounded by a plurality of edges. Each edge joins the flank face with one of the side faces. The plurality of edges comprises a first cutting edge and a second cutting edge. The first cutting edge has a shape corresponding to a portion of a first bent curve and the second cutting edge has a shape corresponding to a portion of a second bent curve. The second bent curve is obtainable by a translation of the first bent curve along a width direction of the cutting insert. The cutting insert has a two-fold rotational symmetry with respect to an axis of symmetry that is perpendicular to the
(Continued)

width direction, a longitudinal direction of the cutting insert being perpendicular to the width direction and the axis of symmetry.

15 Claims, 6 Drawing Sheets

(51) Int. Cl.
 *B23D 37/00* (2006.01)
 *B23B 1/00* (2006.01)

(52) U.S. Cl.
 CPC . *B23B 2200/0447* (2013.01); *B23B 2200/086* (2013.01); *B23B 2200/125* (2013.01); *B23B 2200/128* (2013.01); *B23B 2200/202* (2013.01); *B23B 2200/369* (2013.01); *Y10T 82/10* (2015.01); *Y10T 82/2583* (2015.01); *Y10T 407/23* (2015.01)

(58) Field of Classification Search
 CPC ........ B23B 2200/128; B23B 2200/202; B23B 2200/369; B23B 1/00
 See application file for complete search history.

(56) References Cited

FOREIGN PATENT DOCUMENTS

| GB | 2 135 612 A | | 9/1984 |
|----|----|----|----|
| JP | 55011708 A | * | 1/1980 |
| JP | S59-187411 A | | 10/1984 |
| JP | H01-103218 A | | 4/1989 |
| JP | 2000-024824 A | | 1/2000 |
| WO | WO-2006/002862 A1 | | 1/2006 |

OTHER PUBLICATIONS

Notice of Grounds of Rejection in counterpart Japanese Patent Application No. 2014-529365, dated Sep. 13, 2016.
Decision to Grant in counterpart Japanese Patent Application No. 2014-529365, dated Jan. 4, 2017.

* cited by examiner

INDEXABLE CUTTING INSERT, CUTTING INSERT HOLDER, CUTTING TOOL, TURNING DEVICE AND TURNING METHOD

TECHNICAL FIELD

The invention relates to indexable cutting inserts, holders for cutting inserts, turning devices and turning methods.

BACKGROUND ART

DE 10 2004 026 675 C5 discloses a method and a device for machining rotationally symmetrical surfaces of a workpiece. The workpiece is rotationally driven to generate the cutting motion. At least one tool with a blade engages the workpiece in a cutting manner. The blade is advanced relative to the workpiece in such a way that the active site between the blade and the workpiece travels along the blade. The blade is moved around a tool rotational axis with a circular arc-shaped advancing motion that is substantially slower than the cutting motion. The blade has the form of a coaxial helix in relation to the rotational axis of the block.

When the blade is advanced, the blade is pivoted around an arc angle corresponding to the arc angle across which the helical blade extends. Given the circular arc-shaped pivoting motion of the blade, the active site travels in an axial direction across the blade's entire axial width during a pivoting motion. Because the blade only engages the limited area of the active site, only relatively minor cutting forces occur, even in the case of a wider blade.

The method and device disclosed in DE 10 2004 026 675 C5 allow the machining of rotationally symmetrical surfaces of a workpiece wherein the formation of a helical surface structure, which is referred to as a twist, of the workpiece can be avoided. The twist can be disadvantageous if, for example, shaft exit points of motors, drives and other machines are to be sealed in the area of the surfaces by radially fitting gaskets.

CITATION LIST

Patent Literature

[PTL 1] DE 10 2004 026 675 C5

SUMMARY OF INVENTION

Technical Problem

In the technical field of turning, it can be of advantage to use indexable cutting inserts. Indexable cutting inserts can be rotated or flipped without disturbing the overall geometry of the tool. Using indexable cutting inserts can help to machine a greater number of workpieces without providing a new cutting insert.

However, due to the helical shape of the blade used in the method and device of DE 10 2004 026 675 C5, providing an indexable cutting insert for use therein, in particular an indexable cutting insert, that can be manufactured in a cost efficient manner is an issue.

It is an object of the present invention to provide an indexable cutting insert, as well as a cutting insert holder, a turning device and a turning method for manufacturing a substantially twist-free rotationally symmetrical surface of a workpiece when an indexable cutting insert can be used.

Solution to Problem

An indexable cutting insert according to the present invention comprises a flank face having a generally parallelogram shape and a plurality of side faces. The flank face is bounded by a plurality of edges. Each edge joins the flank face with one of the side faces. The plurality of edges comprises a first cutting edge and a second cutting edge. The first cutting edge has a shape corresponding to a portion of a first bent curve and the second cutting edge as a shape corresponding to a portion of a second bent curve. The second bent curve is obtainable by a translation of the first bent curve along a width direction of the cutting insert. The cutting insert has a two-fold rotational symmetry with respect to an axis of symmetry that is perpendicular to the width direction. A longitudinal direction of the cutting insert is perpendicular to the width direction and the axis of symmetry.

Due to the two-fold rotational symmetry of the cutting insert, the cutting insert can be inserted into an insert pocket of a cutting insert holder of a turning device in two different orientations, which allow to use either the first cutting edge or the second cutting edge as an active cutting edge that interacts with the workpiece in the turning operation. The bent curve shape of the first and the second cutting edge allows to use the indexable cutting insert for manufacturing surfaces without a twist. Since the first and the second cutting edge have shapes corresponding to portions of a first and a second bent curve, respectively, wherein the second bent curve is obtainable by a translation of the first bent curve along the width direction of the cutting insert, the cutting insert can be manufactured in a convenient manner by moving a grinding tool, for example a rotating grinding disc, along the longitudinal direction of the cutting insert, wherein the grinding disc rotates around an axis that is aligned substantially parallel to the width direction of the cutting insert. Thus, both cutting edges can be ground simultaneously in a convenient manner.

In embodiments, an extension of the cutting insert in the longitudinal direction is greater than an extension of the cutting insert in the width direction, greater than two times the extension of the cutting insert in the width direction and/or greater than four times the extension of the cutting insert in the width direction.

A relatively large extension of the cutting insert in the longitudinal direction allows to machine rotationally symmetrical surfaces of a workpiece having a relatively large extension in the axial direction of the workpiece by pivoting the cutting insert around an axis of rotation parallel to an axis of rotation of the workpiece without requiring a motion of the indexable cutting insert in the axial direction of the workpiece.

In embodiments, each of the side surfaces is parallel to the axis of symmetry. The shape of the first cutting edge can be a first circular arc and the shape of the second cutting edge can be a second circular arc having, as same radius as the first circular arc. Each of the first and the second cutting edge can be convexly curved.

Providing a convexly curved shape of the first and the second cutting age, for example a circular arc shape of the first and second cutting, edge, can be of advantage for manufacturing rotationally symmetrical surfaces of a workpiece without a twist, since, thus, the active site at which the active one of the first and the second cutting edge interacts with the workpiece can be provided at a substantially constant distance to the axis of rotation of the workpiece.

In embodiments, the cutting insert further comprises a groove at the flank face of the cutting insert, wherein the groove is arranged between the first cutting edge and the second cutting edge. Providing the groove can simplify the manufacturing of the cutting insert since, thus, only portions of the flank face between the cutting edges and the edges of the groove need to be ground, so that the surface area that needs to be ground is reduced compared to embodiments wherein the entire flank face is ground.

In embodiments, the first cutting edge has a highest point having a greater value of a coordinate along a vertical coordinate axis than any other point on the first cutting edge. The vertical coordinate axis is parallel to the axis of symmetry and points in a direction from a bottom face of the cutting insert towards the flank face. The bottom face is opposite to the flank face. The second cutting edge has a highest point having a greater value of a coordinate along the vertical coordinate axis than any other point on the second cutting edge. The highest point of the first cutting edge is at to distance to as center of the first cutting edge and the highest point of the second cutting edge is at a distance to a center of the second cutting edge.

In embodiments, the cutting insert has a flat bottom face that is opposite the flank face. The bottom face is perpendicular to the axis of symmetry. A flat bottom face can provide a convenient way of providing an appropriate orientation of the cutting insert relative to the rotating workpiece in both possible orientations of the cutting insert, since the cutting insert can be oriented by placing the cutting insert on a flat bottom surface of an insert pocket of a cutting insert holder in a turning device.

A cutting insert holder according to the present invention for an indexable cutting insert as described above, wherein the cutting insert has a flat bottom face that is opposite the flank face and perpendicular to the axis of symmetry comprises a cutting insert receiving portion and an insert pocket. The cutting insert receiving portion has a top surface. The insert pocket is adapted to receive the cutting insert. The insert pocket has a longitudinal direction that is inclined relative to a centerline of the top surface of the cutting insert receiving portion at an angle different from a right angle, and a bottom surface that is inclined relative to a portion of the top surface adjacent the insert pocket both in the longitudinal direction of the insert pocket and in a width direction of the insert pocket that is perpendicular to the longitudinal direction of the insert pocket.

In a turning operation, a rotating feed motion of the cutting insert holder around an axis of rotation that is parallel to an axis of rotation of a rotating workpiece can be provided. In doing so, the top surface of the cutting insert receiving portion can move in the vicinity of the surface of the workpiece. By inclining the bottom surface of the insert pocket relative to the portion of the top surface adjacent the insert pocket in the width direction of the insert pocket, one of the first and the second cutting edge of a cutting insert provided in the insert pocket, being an active cutting edge, can protrude from the top surface of the cutting insert receiving portion to a greater extent than the other of the first and the second cutting edge that is an inactive cutting edge. Thus, it can be ensured that only the active cutting edge interacts with the workpiece. By inclining the bottom surface relative to the portion of the top surface adjacent the insert pocket in the longitudinal direction of the insert pocket, it can be achieved that, in a position of the cutting insert holder wherein the center of the active cutting edge is in a same plane as the axis of rotation of the workpiece and the axis of rotation of the cutting insert holder, the center of the active cutting edge is at a smaller distance to the axis of rotation of the workpiece than any other point of the active cutting edge. Thus, the turning operation can proceed in a symmetrical manner, and a substantially twist-free workpiece surface can be obtained.

A turning device according to the present invention comprises a workpiece drive unit, an indexable cutting insert as described above, a cutting tool and a tool feed unit. The workpiece drive unit is configured to receive a workpiece and to provide a rotary main cutting motion of the workpiece around a first axis of rotation. The cutting tool comprises a cutting insert holder and the cutting insert. The cutting insert holder comprises an insert pocket adapted to receive the cutting insert. The tool feed unit is configured to provide a rotary feed motion of the cutting tool around a second axis of rotation. The second axis of rotation is parallel to the first axis of rotation. A rotational speed of the feed motion is slower than a rotational speed of the main cutting motion of the workpiece. The cutting insert holder is adapted to fix the cutting insert in the insert pocket in a working position such that one of the first cutting edge and the second cutting edge being an active cutting edge interacts with the workpiece when the main cutting motion and the feed motion are provided. The working position is adapted such that, when the cutting tool is in such a position that the center of the active cutting edge is in a same plane as the first axis of rotation and the second axis of rotation, the cutting insert is tilted relative to a working plane. The working plane is parallel to the first and the second axis of rotation, perpendicular to the said same plane, and runs through the center of the active cutting edge. The tilt of the cutting insert relative to the working plane is such that a normal of the working plane is inclined relative to the axis of symmetry of the cutting insert both in the width direction and in the longitudinal direction of the cutting insert.

By inclining the axis of symmetry of the cutting insert relative to the normal of the working plane in the width direction, it can be ensured that only the active cutting, edge interacts with the workpiece when the main cutting motion and the feed motion are provided. By additionally inclining the axis of symmetry of the cutting insert in the longitudinal direction of the cutting insert, an arrangement of the active cutting edge relative to the workpiece can be obtained that allows a manufacturing of a substantially twit-free rotationally symmetrical surface of the workpiece as described above.

In embodiments, the working position is adapted such that, when the cutting tool is in such a position that the center of the active cutting edge is in the said same plane, any point of the active cutting edge other than the center of the active cutting edge is on a same side on the working plane as the second axis of rotation. This orientation of the cutting insert can be particularly advantageous for obtaining a substantially twist-free rotationally symmetrical surface of the workpiece.

In embodiments, the working position can be adapted such that, when the cutting tool is in such a position that the center of the active cutting edge is in the said same plane, an inactive cutting edge being one of the first and the second cutting edge other than the active cutting edge is located on a same side of the working plane as the second axis of rotation, and any point of the inactive cutting edge is at a distance to the working plane. Thus, an interaction of the inactive cutting edge with the workpiece can be avoided.

In embodiments, the cutting insert can be a cutting insert wherein the shape of the first cutting edge is a first circular arc, and the shape of the second cutting edge is a second circular arc having a same radius as the first circular arc, and wherein the radius of the first and the second circular arc corresponds to as radius of curvature of a helix, the helix having a radius and a slope angle, the radius of the helix being equal to a distance between the second axis of rotation and the center of the active cutting edge, the slope angle of the helix being equal to an angle between the longitudinal direction of the cutting insert and the second axis of rotation that is different from zero.

Thus, the arrangement of the active cutting edge relative to the second axis of rotation can substantially correspond to or at least approximately the shape of as helix around the second axis of rotation, which is particularly advantageous for obtaining a substantially twist-free rotationally symmetrical workpiece surface.

In embodiments, the cutting insert can comprise a flat bottom face that is opposite the flank face, the bottom face being perpendicular to the axis of symmetry, the cutting insert holder can have the features described above, and the cutting insert holder can be arranged such that the centerline of the cutting insert receiving portion of the cutting insert holder is perpendicular to the second axis of rotation. Thus, an arrangement of the cutting insert for obtaining a substantially twist-free rotationally symmetrical surface of the workpiece can be provided in a convenient manner.

A turning method according to the present invention comprises providing a cutting insert as described above. The cutting insert is mounted in a cutting insert holder. A workpiece is rotated around a first axis of rotation. The cutting insert holder is rotated around a second axis of rotation at a speed of rotation that is slower than the speed of rotation of the workpiece. The second axis of rotation is parallel to the first axis of rotation. The cutting insert is fixed in the cutting insert bolder such that one of the first cutting edge and the second cutting edge being an active cutting edge interacts with the workpiece when the workpiece and the cutting insert holder are rotated. When the cutting insert holder is in such at position that a center of the active cutting edge is in a same plane as the first axis of rotation and the second axis of rotation, the cutting insert is tilted relative to a working plane. The working plane is parallel to the first and the second axis of rotation and perpendicular to the said same plane. A normal of the working plane is inclined relative to the axis of symmetry of the cutting insert both in the width direction and in the longitudinal direction of the cutting insert.

DESCRIPTION OF EMBODIMENTS

In the following, embodiments of the present invention will be described.

Figure 1A:
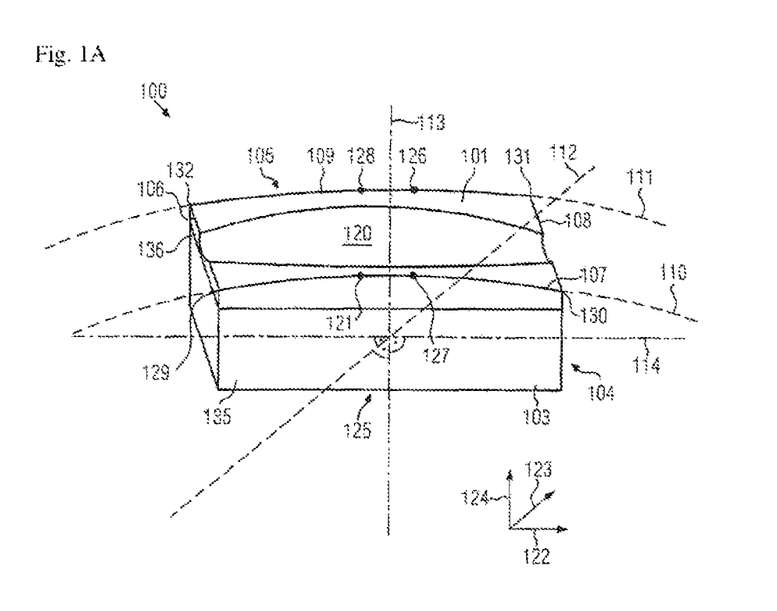
FIG. 1A shows a schematic perspective view of a cutting insert according to an embodiment.

FIG. 1A shows a schematic perspective view of a cutting insert 100 according to an embodiment. For illustrating the arrangement of portions of the cutting insert 100, in the following, reference will be made to a coordinate system comprising a first coordinate axis 122, a second coordinate axis 123 and a third coordinate axis 124. For convenience, the coordinate axes 122 and 123 will be denoted as horizontal coordinate axes, and the coordinate axis 124 will be denoted as vertical coordinate axis. The denotation of the coordinate axes 122, 123 as horizontal and the denotation of the coordinate axis 124 as vertical corresponds to an arrangement wherein a bottom face 125 of the cutting insert 100 rests on a horizontal surface that is arranged in a plane parallel to the coordinate axes 122, 123. When used in a turning device, the cutting insert 100 can be arranged differently with respect to horizontal and vertical directions, as will be detailed below.

Figure 1B:
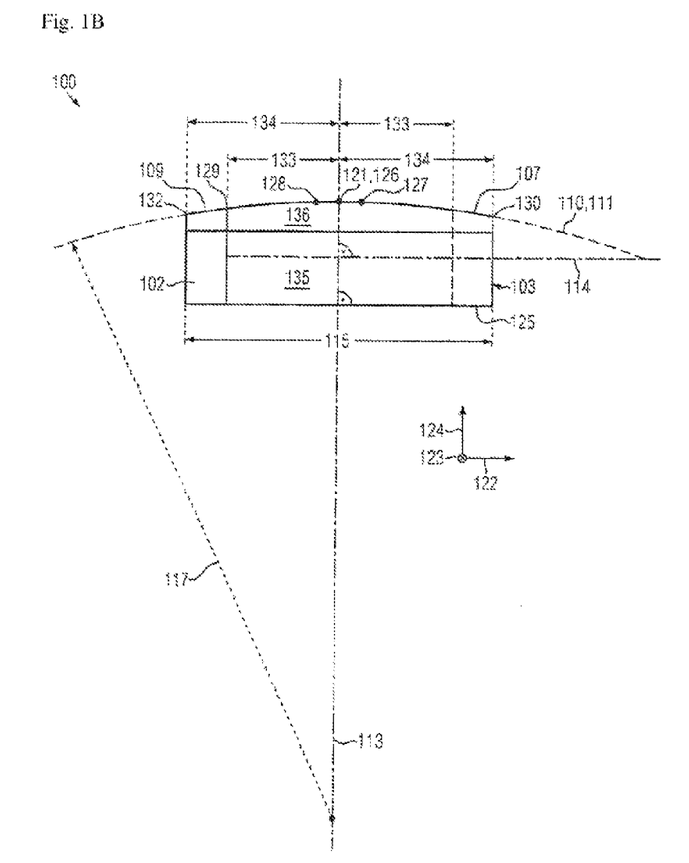
FIG. 1B shows a schematic side view of a cutting insert according to an embodiment.
Figure 1C:
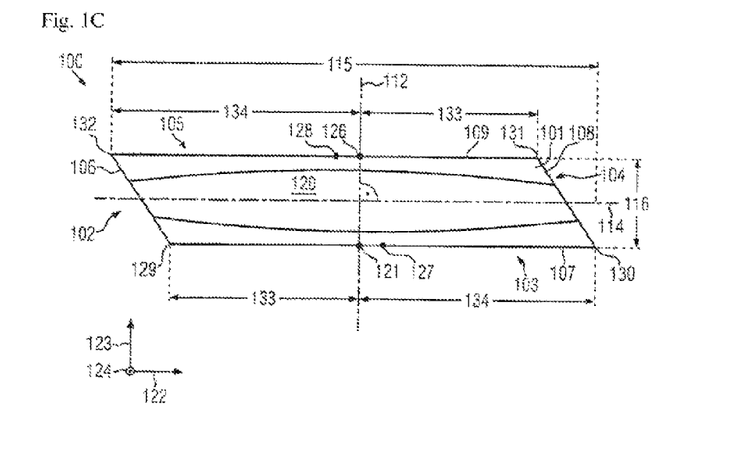
FIG. 1C shows a schematic top view of a cutting insert according to an embodiment.
Figure 1D:
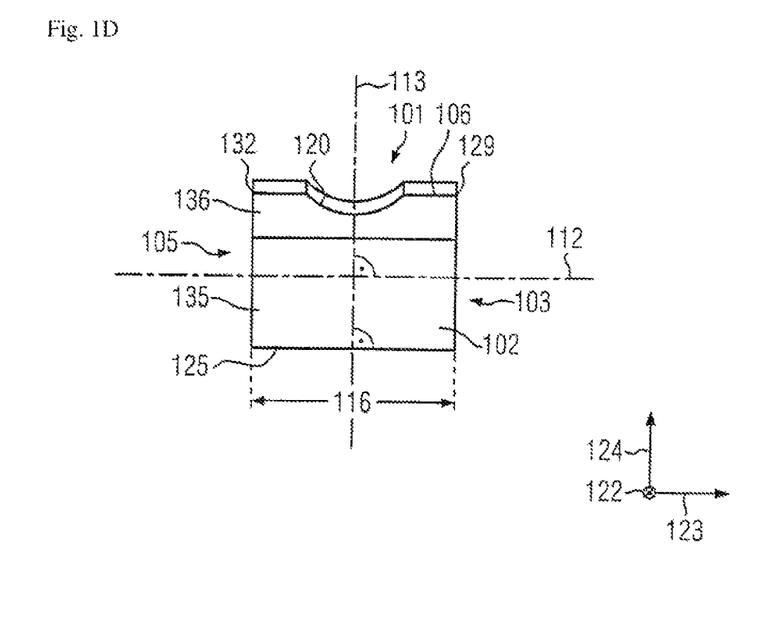
FIG. 1D shows a schematic side view of a cutting insert according to an embodiment from a viewing direction that is substantially perpendicular to the viewing direction of FIG. 1B.

Further views of the cutting insert 100 are shown in FIGS. 1B, 1C and 1D. FIG. 1B shows a schematic side view of the cutting insert 100, wherein the viewing direction is along the second horizontal coordinate axis 123, FIG. 1C shows a schematic top view, wherein the viewing direction is opposite the vertical coordinate axis, and FIG. 1D shows a schematic side view wherein the viewing direction is along the first coordinate axis 122.

The cutting insert 100 has a flank face 101 and side faces 102, 103, 104 and 105. Additionally, the cutting insert 100 has a bottom face 125 that is opposite the flank face 101. Each of the side faces are perpendicular to the bottom face 125. In the arrangement of the cutting insert 100 shown in FIGS. 1A to 1B, the side faces 103, 105 are parallel to a plane of the coordinate axes 122, 124, and the bottom face 125 is in a plane of the horizontal coordinate axes 122, 123.

The side faces 102, 104 are parallel to the vertical coordinate axis 124 and perpendicular to the bottom face 125 and the plane of the horizontal coordinate axes 122, 123. However, the side faces 102, 104 are arranged at an angle different from a right angle to the horizontal coordinate axis 122 and the side faces 103, 105, which are parallel to the coordinate axis 122. The side faces 102, 104 of the cutting insert 100 are parallel to each other, and the side faces 103, 105 are also parallel to each other.

As can be seen, in particular, in the top view of FIG. 1C, the flank face 101 of the cutting insert 100 has a generally parallelogram shape, wherein the term "generally parallelogram shape" is to be understood as including deviations from an ideal parallelogram shape due to a curvature of the flank face and the presence of a groove 120 in the flank face, as will be described in detail below.

Due to the generally parallelogram shape of the flank face 101, at corners 129, 131 of the flank face 101, side faces adjacent the corners 129, 131 intersect at an obtuse angle. In particular, at the corner 129, the side faces 102, 103 intersect at an obtuse angle, and at corner 131, the side faces 104, 105 intersect at the same obtuse angle. At a corner 132, the side faces 102, 105 intersect at an acute angle, and at corner 130, the side faces 103, 104 intersect at the same acute angle.

Reference numeral 114 denotes a longitudinal direction of the cutting insert 100, and reference numeral 112 denotes a width direction of the cutting insert 100. The longitudinal direction 114 is parallel to the first horizontal coordinate axis 122, and parallel to the side faces 103, 105. The width direction 112 is perpendicular to the longitudinal direction 114 and is parallel to each of the horizontal coordinate axes 122, 123.

As can be seen, in particular, in the top view of FIG. 1C, an extension 116 of the cutting insert 100 in the width direction 112 is smaller than any extension of the cutting insert 100 in any other horizontal direction lying in the plane of the horizontal coordinate axes 122, 123. The extension 116 of the cutting insert 100 in the width direction 112 corresponds to a distance between the side faces 103, 105 of the cutting insert 100. An extension 115 of the cutting insert 100 in the longitudinal direction 114 can be greater than the extension 116 in the width direction 112, greater than two times the extension 116 in the width direction 112 and/or greater than four times the extension 116 in the width direction 112. Thus, the cutting insert 100 can have an elongated shape.

The cutting insert 100 has edges 106, 107, 108, 109 joining the flank face 101 with the side faces 102, 103, 104, 105. In particular, the edge 106 joins the side face 102 with the flank face 101, the edge 107 joins the side face 103 with the flank face 101, the edge 108 joins the side face 104 with the flank face 101, and the edge 109 joins the side face 105 with the flank face 101. The edges 107, 109 are cutting edges of the cutting insert 100, which interact with the workpiece when the cutting insert 100 is used for turning, as will be detailed below. In the following, the edge 107 will be denoted as first cutting edge, and the edge 109 will be denoted as second cutting edge.

The cutting edges 107, 109 extend along the longer sides of the generally parallelogram shape of the flank face 101 of the cutting insert 100.

The first cutting edge 107 has a shape corresponding to a portion of a first bent curve 110. As can be seen, in particular, in the side view of FIG. 1B, the bent curve 110 can be a circle with a radius 117, and the first cutting edge 107 can be a circular arc with the radius 117.

The second cutting edge 109 has a shape corresponding to a portion of a second bent curve 111. The second bent curve 111 can be a circle, so that the second cutting edge 109 has the shape of a circular arc. The radius of the second bent curve 111 can be equal to the radius of the first bent curve 110, so that both cutting edges 107, 109 have the shape of a circular arc with the same radius 117.

The second bent curve 111 defining the shape of the second cutting edge 109 is obtainable by a translation of the first bent curve 110 defining the shape of the first cutting edge 107 along the width direction 112 of the cutting insert 100. Thus, in the side view of FIG. 1B, wherein the viewing direction is along the second horizontal coordinate axis 123 that is parallel to the width direction 112, the bent curves 110, 111 overlap.

In embodiments wherein the cutting edges 107, 109 have a circular arc shape, portions of the flank face 101 adjacent the cutting edges 107, 109 can have a substantially circularly cylindrical, shape, wherein the portion of the flank face 101 adjacent the first cutting edge 107 and the portion of the flank face 101 adjacent the second cutting edge 109 correspond to portions of a same circular cylinder having the radius 117 of the bent curves 110, 111, and wherein an axis of the circular cylinder is parallel to the width direction 112.

The present invention is not limited to embodiments wherein the bent curves 110, 111 are circles. In other embodiments, the bent curves 110, 111 can be non-circular bent curves, for example ellipses, wherein the bent curve 111 is obtainable by a translation of the bent curve 110 along the width direction 112 of the cutting insert 100. In such embodiments, portions of the flank face 101 adjacent the cutting edges 107, 109 can correspond to surface portions of a non-circular cylinder having a cylinder axis parallel to the width direction 112.

Between the first cutting edge 107 and the second cutting edge 109, a groove 120 can be provided at the flank face 101 of the cutting insert 100. The groove 120 extends along the longitudinal direction 114 of the cutting insert 100. As can be seen, for example, in the top view of FIG. 1C, a width of the groove 120 at the center of the cutting insert 100 can be greater than a width of the groove 120 in the vicinity of the side surfaces 102, 104.

Due to the shape of the cutting edges 107, 109 defined by bent curves 110, 111, as described above, the cutting edges 107, 109 can be formed by grinding the flank face 101 of the cutting insert 100 by means of a grinding tool, which can comprise a grinding disk that is rotated around an axis parallel to the width direction 112 of the cutting insert 100, and is moved across the flank face 101 along the longitudinal direction 114 of the cutting insert 100. Thereby, the grinding disk can be moved on a curved path, so that the shape of the cutting edges 107, 109 defined by the bent curves 110, 111 is obtained. Thus, the flank face 101 and the cutting edges 107, 109 can be formed in a convenient manner.

By providing the groove 120 between the cutting edges 107, 109, the surface area of the cutting insert 100 that needs to be around in the formation of the cutting edges 107, 109 can be reduced, since only portions of the flank face 101 between the cutting edges 107, 109 and the groove 120 are ground, whereas a grinding of the bottom surface of the groove 120 is not necessary.

Reference numeral 113 denotes an axis of symmetry of the cutting insert 100. The cutting insert has a two-fold rotational symmetry with respect to the axis of symmetry 113, so that the shape of the cutting insert 100 looks the same after a rotation of 180° around the axis of symmetry 113.

Due to the generally parallelogram shape of the flank face 101, the arrangement of the side faces 102, 103, 104, 105 parallel to the vertical coordinate axis 124, and the arrangement of the bottom surface 125 perpendicular to the vertical coordinate axis 124, the axis of symmetry 113 is parallel to the vertical coordinate axis 124. The axis of symmetry 113 is perpendicular to the width direction 112, the length direction 114 and the horizontal coordinate axes 122, 123.

Due to the rotational symmetry of the cutting insert 100, the cutting insert 100 can be used for turning in two different orientations, wherein either the first cutting edge 107 or the second cutting edge 109 interacts with the workpiece, depending on the orientation of the cutting insert 100. After rotation of the cutting insert by 180° around the axis of symmetry 113, after a turning operation wherein the first cutting edge interacted with the workpiece, the second cutting edge 109 interacts with workpiece in the same manner as the cutting edge 107 interacted with the workpiece before the rotation. Accordingly, the cutting insert 100 is an indexable cutting insert.

Since the side surfaces 102, 103, 104, 105 of the cutting insert 100 are parallel to the vertical coordinate axis 124, and the axis of symmetry 113 is parallel to the vertical coordinate axis 124, each of the side surfaces 102 to 105 is parallel to the axis of symmetry 113. Moreover, the flat bottom surface 125 of the cutting insert 100 is perpendicular to the axis of symmetry 113.

Reference numeral 127 denotes a center of the first cutting edge 107 that is at an equal distance to each of the corners 129, 130 of the flank face 101 at the ends of the first cutting edge 107. Reference numeral 128 denotes it center of the second cutting edge 109 that is at an equal distance to each of the corners 131, 132 of the flank face 101 that are located at the ends of the second cutting edge 109.

Reference numeral 121 denotes a highest point of the first cutting edge 107 that has a greatest value of a coordinate along the vertical coordinate axis 124 than any other point on the first cutting edge 107. Since the bottom face 125 of the cutting insert 100 is perpendicular to the vertical coordinate axis 124, the highest point 121 of the first cutting edge 107 is the point of the first cutting edge 107 having the greatest distance to the bottom face 125.

Reference numeral 126 denotes as highest point of the second cutting edge 109 having a greater value of the coordinate along the vertical coordinate axis 124 and a greater distance than the bottom face 125 than any other point on the second cutting edge 129.

As detailed above, the shapes of the first cutting edge 107 and the second cutting edge 109 correspond to portions of a first bent curve 110 and a second bent curve 111, respectively, wherein the second bent curve 111 is obtainable by a translation of the first bent curve 110 along the width direction 112 of the cutting insert 100, which is parallel to the viewing direction of the side view 1B. Therefore, in the side view of FIG. 1B, the highest points 121, 126 of the cutting edges 107, 109 overlap.

However, due to the generally parallelogram shape of the flank face 101, the centers 127, 128 of the first cutting edge 107 and the second cutting edge 109, respectively, do not overlap in the side view of FIG. 1B. To the contrary, in the side view of FIG. 1B, the center 127 of the first cutting edge 107 is on the right side of the highest points 121, 126, and the center 128 of the second cutting edge 109 is to the left of the highest points 121, 126. The highest point 121 of the first cutting edge 107 is at a distance 133 to the corner 129 and at a distance 134 to the corner 130. The highest point 126 of the second cutting edge 109 is at the distance 133 to the corner 131 and at the distance 134 to the corner 132, wherein the distance 133 is smaller than the distance 134.

Accordingly, the centers 127, 128 of the cutting edges 107, 109 are closer to the bottom face 125 of the cutting insert 100 than the highest points 121, 126.

The cutting insert 100 can comprise portions 135, 136 that are formed of different materials, for example, an upper portion 136 of the cutting insert 100 comprising the flank face can comprise cubic boron nitride, and a lower portion 135 comprising the bottom face 125 can comprise a different material, for example tungsten carbide.

Figure 2:
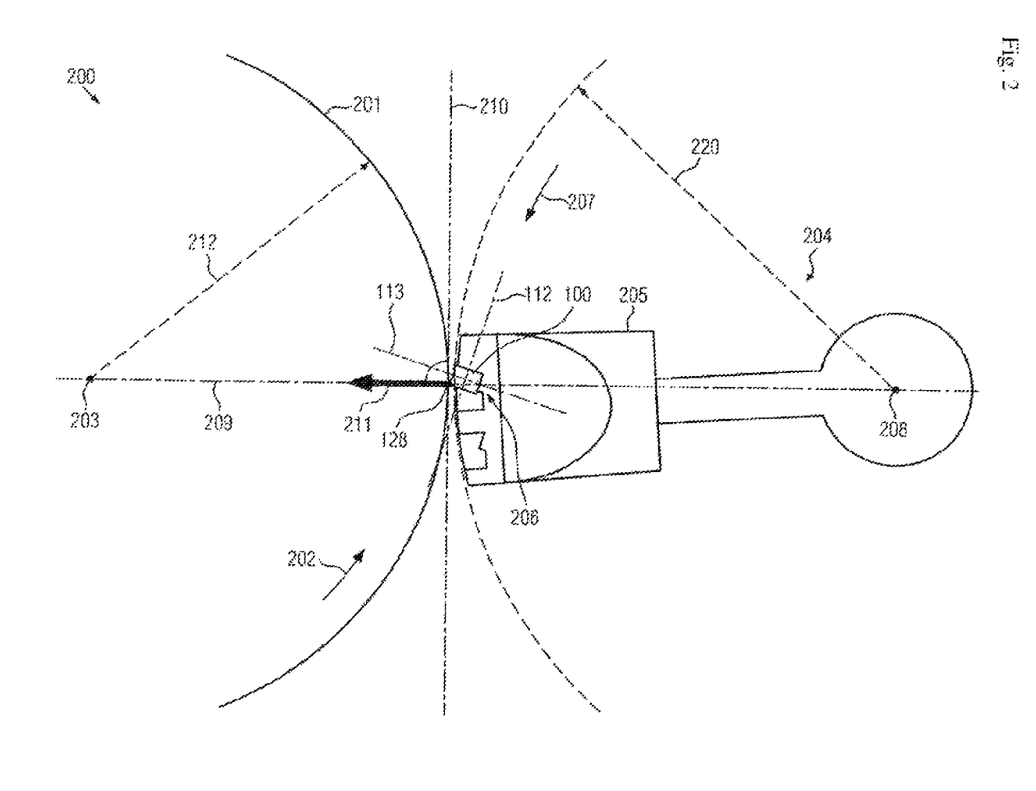
FIG. 2 shows a schematic side view of a turning device according to an embodiment.

FIG. 2 shows a schematic side view of a turning device 200 according to the present invention. For clarity, some features of the turning device have been omitted. Moreover, some features of the turning device 200 can correspond to features of the turning device described in DE 10 2004 026 675 C5, and a detailed description thereof will be omitted.

Reference numeral 201 denotes a workpiece. The workpiece 201 can be rotated around a first axis of rotation 203, which is perpendicular to the plane of drawing of FIG. 2. The rotation of the workpiece 201 provides a main cutting motion of the workpiece 201 in the turning operation. The direction of the main cutting motion of the workpiece 201 around the first axis of rotation 203 is schematically denoted by arrow 202.

Figure 3A:
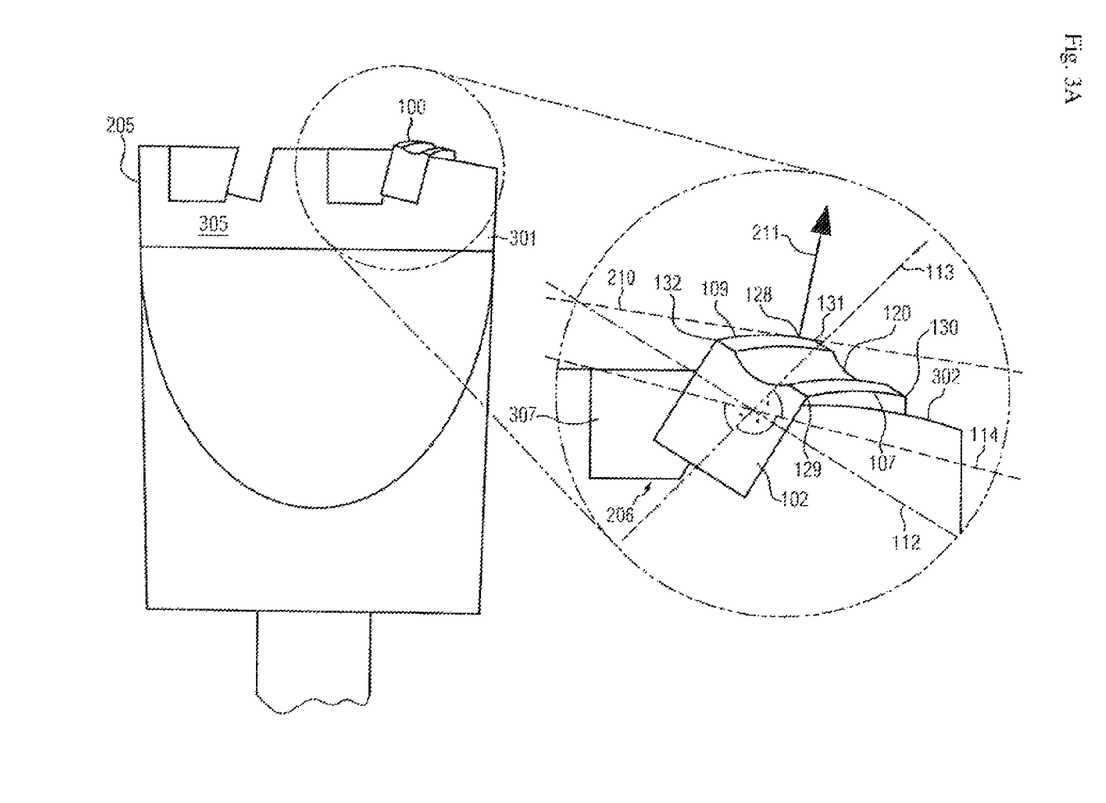
FIG. 3A shows a schematic side view of a cutting insert holder according to an embodiment.
Figure 3B:
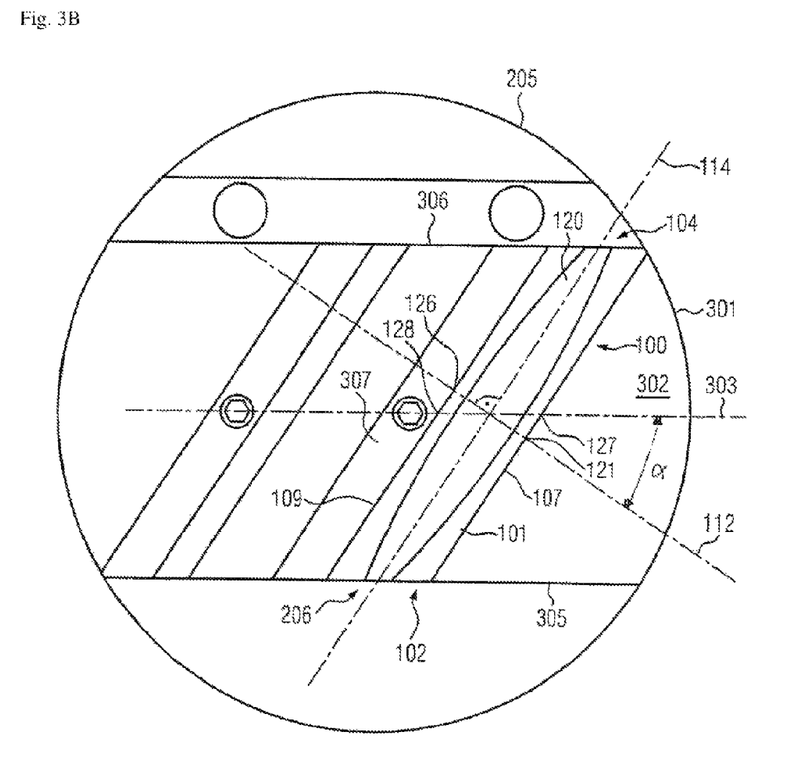
FIG. 3B shows a schematic top view of a cutting insert holder according to an embodiment.
Figure 3C:
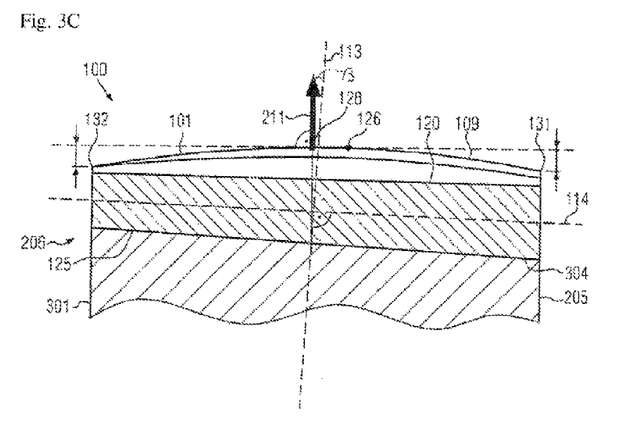
FIG. 3C shows a schematic cross-sectional view of a cutting insert receiving portion of the cutting insert holder and a cutting insert inserted therein according to an embodiment.

The turning device 200 further comprises a cutting tool 204. The cutting tool 204 comprises a cutting insert holder 205 and a cutting insert 100 as described above with reference to FIGS. 1A to 1D. More detailed views of the cutting insert holder 205 are shown in FIGS. 3A to 3C which will be described in more detail below. The cutting insert holder 205 comprises an insert pocket 206 adapted to receive the cutting insert 100. The cutting insert 100 is mounted in the cutting insert holder 205 so that the cutting insert 100 is fixed in the insert pocket 206 in a working position of the cutting insert 100.

The cutting insert holder 205 can be rotated around a second axis of rotation 208. The second axis of rotation 208 is parallel to the first axis of rotation 203, and is perpendicular to the plane of drawing of FIG. 2. The rotation of the cutting insert holder 205 around the second axis of rotation 208 provides a feed motion of the cutting tool 204. In FIG. 2 the direction of the rotary feed motion of the cutting tool 204 is schematically denoted by arrow 207. The rotational speed of the feed motion 207 is substantially slower than the rotational speed of the main cutting motion 202 of the workpiece 201. Thus, the machining of the workpiece 201 is a turning operation, wherein the relative motion of the cutting tool 204 and the workpiece 201 is mostly provided by the rotary main cutting motion 202 of the workpiece 201.

The cutting insert holder 205 is adapted to fix the cutting insert 100 in the insert pocket 206 in the working position such that one of the first cutting edge 107 and the second cutting edge 109 being an active cutting edge interacts with the workpiece 201. In the following, an example will be described wherein the second cutting edge 109 of the cutting insert 100 is the active cutting edge. However, the first cutting edge 107 can also be used as an active cutting edge, if the cutting insert 100 is inserted into the cutting insert holder 205 in an orientation that is rotated by 180° around the axis of symmetry 113 of the cutting insert 100 relative to the orientation shown in FIGS. 2, 3A, 3B and 3C.

One of the first cutting edge 107 and the second cutting edge 109 other than the active cutting edge does not interact with the work piece 201 in the turning operation, thus being an inactive cutting edge. However, if the cutting insert 100 is inserted into the insert pocket 206 of the cutting insert holder 205 in an orientation rotated by 180° around the axis of symmetry 113 of the cutting insert, the other cutting edge becomes the active cutting edge interacting with the workpiece. Thus the cutting edges 107, 109 can subsequently be used for machining workpieces.

In the schematic side view of FIG. 2, the turning device 200 is shown with such a position of the cutting tool 204 that the center 128 of the active cutting edge 109 is in a same plane 209 as the first axis of rotation 203 and the second axis of rotation 208. During the turning operation, the cutting tool 204 is rotated around the second axis of rotation 208 from an initial position wherein the center 128 of the active cutting edge 109 is above the plane 209 to an end position wherein the center 128 of the active cutting edge 109 is below the plane 209. The center 128 of the active cutting edge 109 moves on a portion of a circle, wherein the center 128 of the active cutting edge 109 is at as distance 220 to the second axis of rotation 208.

In the position of the cutting tool 204 shown in FIG. 2, the center 128 of the active cutting edge 100 interacts with the workpiece 201, wherein a rotationally symmetrical surface of the workpiece 201 is obtained. A radius 212 of the rotationally symmetrical surface of the workpiece 201 corresponds to a difference between the distance between the first axis of rotation 203 and the second axis of rotation 208 and the distance 220 between the center 128 of the active cutting edge 109 and the second axis of rotation 208. The initial radius of the workpiece 201 before the machining of the workpiece 201 is greater than the radius 212.

Reference numeral 210 denotes a working plane. The working plane 210 is perpendicular to the plane 209 comprising the first axis of rotation 203 and the second axis of rotation 208. Moreover, the working plane 210 runs through the center 128 of the active cutting edge 109 when the cutting tool 204 is in the position shown in FIG. 2. Thus, in the position of the cutting tool 204 shown in FIG. 2, the interaction between the center 128 of the active cutting edge 109 and the workpiece 201 occurs at a point lying in the working plane 210.

Reference numeral 211 denotes a normal vector of the working plane 210 that is perpendicular to the working plane 210. The axis of symmetry 113 of the cutting insert 100 as well as the longitudinal direction 112 of the cutting insert 100 are inclined relative to the normal 211 of the working plane 210 when the cutting tool 204 is in the position shown in FIG. 2, wherein the normal 211 of the working plane 210 is inclined relative to the axis of symmetry 113 of the cutting insert 100 both in the width direction 112 and in the longitudinal direction 114 of the cutting insert 100.

FIGS. 3A, 3B and 3C show views of the cutting insert holder 205 with the cutting insert 100 inserted in the insert pocket 206.

FIG. 3A shows a schematic side view of the cutting insert holder 205, and FIG. 3B shows a schematic top view of the cutting insert holder 205. FIG. 3C shows a schematic cross-sectional view of a cutting insert receiving portion 301 of the cutting insert holder 205 wherein the insert pocket 206 is provided along a plane comprising the longitudinal direction 114 of the cutting insert 100. In FIGS. 3A and 3C, the working plane 210 and the normal 211 of the working plane 210 in the position of the cutting tool 204 shown in FIG. 2 are shown.

The cutting insert receiving portion 301 has a top surface 302 that faces the workpiece 201 during the turning operation. The flank face 101 of the cutting insert 100, or at least a portion thereof comprising the active cutting edge 109, protrudes from the top surface 302, so that the active cutting edge 109 can interact with the workpiece 201 while the top surface 302 of the cutting insert receiving portion 301 is at a distance to the workpiece 201.

The cutting insert receiving portion 301 further has side surfaces 305, 306, which are arranged perpendicular to the second axis of rotation 208 around which the cutting insert holder 205 is rotated during the turning operation. Between the side surfaces 305, 306 of the cutting insert receiving portion 301, there is a centerline 303 of the cutting insert holder 205, being a notional line which is arranged at an equal distance to each of the side surfaces 305, 306.

In addition to the cutting insert receiving portion 301, the cutting insert holder 205 can comprise further components which can include a substantially cylindrical portion provided at a smaller distance to the second axis of rotation 208 than the cutting insert receiving portion 301.

The insert pocket 206 of the cutting insert holder 205 has as longitudinal direction and a width direction. When the cutting insert 100 is inserted into the insert pocket 206, the longitudinal direction 114 of the cutting insert 100 is oriented in the longitudinal direction of the insert pocket 206, and the width direction 112 of the cutting insert 100 is oriented in the width direction of the insert pocket 206.

For fixing the cutting insert 100 in the insert pocket 206 in the working position, the cutting insert holder can comprise a cutting insert fixing block 307 that can be releasably connected to other portions of the cutting insert holder 205, for example by means of a screw connection.

As can be seen in the top view of FIG. 3B, the longitudinal direction of the insert pocket 206 and, accordingly, the longitudinal direction 114 of the cutting insert 100 inserted into the insert pocket 206, are inclined relative to the centerline 303 of the top surface 302 of the cutting insert receiving portion 301 at an angle Alpha different from a right angle, for example at an angle in a range from 15 degree to 60 degree. The angle between the centerline 303 and the longitudinal direction of the insert pocket 206, as well as the extension 115 of the cutting insert 100 in the longitudinal direction 114 of the cutting insert 100 can be adapted such that the side faces 102, 103 of the cutting insert 100 protrude from the side surfaces 305, 306 of the cutting insert receiving portion 301 to a small extent only, or substantially do not protrude from the side surfaces 305, 306. Moreover, when the cutting insert 100 is inserted into the insert pocket 206 of the cutting insert bolder 205, the center 121 of the first cutting edge 107 and the center 128 of the second cutting edge 109 are arranged at the centerline 303 of the cutting insert receiving portion 301 of the cutting insert holder 205.

The insert pocket 206 of the cutting insert holder 205 has a bottom surface 304. When the cutting insert 100 is inserted into the insert pocket 206, the bottom face 125 of the cutting insert 100 rests on the bottom surface 304 of the insert pocket 206.

Since, as detailed above, the bottom face 125 of the cutting insert 100 is perpendicular to the axis of symmetry 113 of the cutting insert 100, when the cutting insert 100 is in the working position in the insert pocket 206, the axis of symmetry 113 of the cutting insert 100 is perpendicular to the bottom surface 304 of the insert pocket 206.

The bottom surface 304 of the insert pocket 206 is inclined relative to a portion of the top surface 302 of the cutting insert receiving portion 301 adjacent the insert pocket 206 both in the longitudinal direction of the insert pocket 206 and the width direction of the insert pocket 206.

The inclined orientation of the bottom surface 304 of the insert pocket 206 can provide the inclination of the normal 211 of the working plane 210 relative to the axis of symmetry 113 of the cutting insert 100 in the width direction 112 and the longitudinal direction 114 of the cutting insert 100 in the position of the cutting insert holder 205 shown in FIG. 2.

As can be seen, in particular, in the side view of the cutting insert 205 shown in FIG. 3A, wherein the working plane 210 and the normal 211 of the working plane 210 in the position of the cutting insert holder 205 shown in FIG. 2 are shown, due to the inclination of the normal 211 of the working, plane 210 relative to the axis of symmetry 113 of the cutting insert 100 in the width direction 112 of the cutting insert 100, the active cutting edge 109 protrudes from the portion of the top surface 302 adjacent the insert pocket 206, which can be substantially parallel to the working plane 210, to a greater extent that the inactive cutting edge 107. Thus, it can be ensured that only the active cutting edge 109 interacts with the workpiece 201. In embodiments, the angle of tilt of the normal 211 of the working plane 210 relative to the axis of symmetry 113 in the width direction 112 of the cutting insert 100 can be about 7°.

Thus, in the position of the cutting insert holder 205 shown in FIG. 2, any point on the inactive cutting edge 107 is at a distance to the working plane 210.

Additionally, the normal 211 of the working plane 210 is inclined relative to the axis of symmetry 113 of the cutting insert 100 in the longitudinal direction 114 of the cutting insert 100, which can be seen, in particular, in the cross-sectional view of FIG. 3C of the cutting insert receiving portion 301 along the longitudinal direction 114 of the cutting insert 100. For providing the inclination of the normal 211 of the working plane 210 relative to the axis of symmetry 113 in the longitudinal direction 114 of the cutting insert 100, the bottom surface 304 of the insert pocket 206 of the cutting insert holder 205 can be inclined such that the insert pocket has a greater depth on one side of the cutting insert receiving portion 301 (on the right side in the view of FIG. 3C).

Due to the inclination of the normal 211 of the working plane 210 in the longitudinal direction 114 of the cutting insert 100, the center 128 of the active cutting edge 109 can be provided in the working plane 210 in the position of the cutting tool 204 shown in FIG. 2, whereas any other portion of the active cutting edge 109 is located on the same side of the working plane 210 as the second axis of rotation 208. In particular, the highest point 126 of the active cutting edge 109 is provided at a distance to the working plane 210, and is located on a same side of the working plane 210 as the second axis of rotation 208. The corners 131, 132 at the ends of the active cutting edge 109 can be arranged at a substantially equal distance to the working plane 210.

In embodiments wherein the cutting edges 107, 109 of the cutting insert 100 are circular arcs with a radius 117, as described above, the radius 117 of the circular arcs can be adapted such that it corresponds to a radius of curvature of a helix having a radius being equal to the distance 220 between the second axis of rotation 208 and the center 128 of the active cutting edge 109 and a slope angle being equal to the angle Beta between the longitudinal direction 114 of the cutting insert 100 and the second axis of rotation 208 that is different from zero and can have a value in a range from 0.1 degree to 5 degree. The angle between the longitudinal direction 114 of the cutting insert 100 and the second axis of rotation 208 corresponds to the angle between the longitudinal direction of the insert pocket 206 and the second axis of rotation 208.

Thus, the shape of the active cutting edge 109 of the cutting insert 100 provided in the insert pocket 206 approximates the shape of a helix around the second axis of rotation 208. Accordingly, when the cutting insert holder 205 is rotated around the second axis of rotation 208, the portion of the active cutting edge 109 currently interacting with the workpiece 201, which is lying in the plane 209 that comprises the first axis of rotation 203 and the second axis of rotation 208, is always at substantially the same distance to the first axis of rotation 203 and the second axis of rotation 208. Thus, a rotationally symmetrical surface of the workpiece 201 that is substantially free of a twist can be obtained.

The invention claimed is:

1. An indexable cutting insert, comprising:
   a flank face having a generally parallelogram shape and a plurality of side faces, wherein the flank face is bounded by a plurality of edges, each edge joining the flank face with one of the side faces;
   wherein the plurality of edges comprises a first cutting edge and a second cutting edge;
   wherein the first cutting edge has a shape corresponding to a portion of a first bent curve and the second cutting edge has a shape corresponding to a portion of a second bent curve, the second bent curve being obtainable by a translation of the first bent curve along a width direction of the cutting insert; and
   wherein the cutting insert has a two-fold rotational symmetry with respect to an axis of symmetry that is perpendicular to the width direction, a longitudinal direction of the cutting insert being perpendicular to the width direction and the axis of symmetry.

2. A cutting insert according to claim 1, wherein an extension of the cutting insert in the longitudinal direction is greater than an extension of the cutting insert in the width direction.

3. A cutting insert according to claim 1, wherein each of the side surfaces is parallel to the axis of symmetry.

4. A cutting insert according to claim 1, wherein the shape of the first cutting edge is a first circular arch and the shape of the second cutting edge is a second circular arch having a same radius as the first circular arch.

5. A cutting insert according to claim 1, wherein each of the first and the second cutting edge is convexly curved.

6. A cutting insert according to claim 1, further comprising a groove provided at the flank face of the cutting insert, the groove being arranged between the first cutting edge and the second cutting edge.

7. A cutting insert according to claim 1, wherein the first cutting edge has a highest point having a greater value of a coordinate along a vertical coordinate axis than any other point on the first cutting edge,
   wherein the vertical coordinate axis is parallel to the axis of symmetry and points in a direction from a bottom face of the cutting insert towards the flank face, the bottom face being opposite the flank face;
   wherein the second cutting edge has a highest point having a greater value of a coordinate along the vertical coordinate axis than any other point on the second cutting edge;
   wherein the highest point of the first cutting edge is at a distance to a center of the first cutting edge and the highest point of the second cutting edge is at a distance to a center of the second cutting edge.

8. A cutting insert holder for an indexable cutting insert according to claim 7, comprising:
   a cutting insert receiving portion having a top surface;
   an insert pocket adapted to receive the cutting insert, the insert pocket having a longitudinal direction that is inclined relative to a centerline of the top surface of the cutting insert receiving portion at an angle different from a right angle, and a bottom surface that is inclined relative to a portion of the top surface adjacent the insert pocket both in the longitudinal direction of the insert pocket and in a width direction of the insert pocket that is perpendicular to the longitudinal direction of the insert pocket.

9. A cutting tool comprising:
   a cutting insert holder according to claim 8;
   an indexable cutting insert;
   wherein the cutting insert holder comprising an insert pocket adapted to receive the indexable cutting insert.

10. A turning device, comprising:
   a workpiece drive unit configured to receive a workpiece and to provide a rotary main cutting motion of the workpiece around a first axis of rotation;
   an indexable cutting insert according to claim 1;
   a cutting tool comprising a cutting insert holder and the cutting insert, the cutting insert holder comprising an insert pocket adapted to receive the cutting insert;
   a tool feed unit configured to provide a rotary feed motion of the cutting tool around a second axis of rotation, the second axis of rotation being parallel to the first axis of rotation, a rotational speed of the feed motion being slower than a rotational speed of the main cutting motion of the workpiece;
   wherein the cutting insert holder is adapted to fix the cutting insert in the insert pocket in a working position such that one of the first cutting edge and the second cutting edge being an active cutting edge interacts with the workpiece when the main cutting motion and the feed motion are provided; and wherein the working position is adapted such that, when the cutting tool is in such a position that the center of the active cutting edge is in a same plane as the first axis of rotation and the second axis of rotation, the cutting insert is tilted relative to a working plane that is parallel to the first and second axis of rotation, perpendicular to the said same plane and runs through the center of the active cutting edge such that a normal of the working plane is inclined relative to the axis of symmetry of the cutting insert both in the width direction and in the longitudinal direction of the cutting insert.

11. A turning device according to claim 10, wherein the working position is adapted such that, when the cutting tool is in such a position that the center of the active cutting edge is in the said same plane, any point of the active cutting edge other than the center of the active cutting edge is on a same side of the working plane as the second axis of rotation.

12. A turning device according to claim 11, wherein the working position is adapted such that, when the cutting tool is in such a position that the center of the active cutting edge is in the said same plane, an inactive cutting edge being one of the first and the second cutting edge other than the active cutting edge is located on a same side of the working plane as the second axis of rotation and any point of the inactive cutting edge is at a distance to the working plane.

13. A turning device according to claim 11, wherein the shape of the first cutting edge is a first circular arch and the shape of the second cutting edge is a second circular arch having a same radius as the first circular arch, and wherein the radius of the first and the second circular arch corresponds to a radius of curvature of a helix having a radius and a slope angle, the radius of the helix being equal to a distance between the second axis of rotation and the center of the active cutting edge, the slope angle of the helix being equal to the angle between the longitudinal direction of the cutting insert and the second axis of rotation that is different from zero.

14. A turning device according to claim 10, wherein the cutting insert holder is arranged such that the centerline of the cutting insert receiving portion of the cutting insert holder is perpendicular to the second axis of rotation.

15. A turning method, comprising:
providing a cutting insert according to claim 1;
mounting the cutting insert in a cutting insert holder;
rotating a workpiece around a first axis of rotation;
rotating the cutting insert holder around a second axis of rotation at a speed of rotation that is slower than the speed of rotation of the workpiece, the second axis of rotation being parallel to the first axis of rotation;
wherein the cutting insert is fixed in the cutting insert holder such that one of the first cutting edge and the second cutting edge being an active cutting edge interacts with the workpiece when the workpiece and the cutting insert holder are rotated; and
wherein, when the cutting insert holder is in such a position that a center of the active cutting edge is in a same plane as the first axis of rotation and the second axis of rotation, the cutting insert is tilted relative to a working plane that is parallel to the first and the second axis of rotation and perpendicular to the said same plane such that a normal of the working plane is inclined relative to the axis of symmetry of the cutting insert both in the width direction and in the longitudinal direction of the cutting insert.

* * * * *